US011019367B2

(12) United States Patent
Wei et al.

(10) Patent No.: US 11,019,367 B2
(45) Date of Patent: May 25, 2021

(54) LIVE VIDEO TRANSMISSION METHOD AND SYSTEM, AND APPARATUS

(71) Applicant: HUAWEI TECHNOLOGIES CO., LTD., Shenzhen (CN)

(72) Inventors: Qikun Wei, Nanjing (CN); Yihong Huang, Nanjing (CN); Yuping Jiang, Beijing (CN); Ruichuan You, Beijing (CN); Shen Zhang, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 14 days.

(21) Appl. No.: 16/382,211

(22) Filed: Apr. 12, 2019

(65) Prior Publication Data

US 2019/0238897 A1 Aug. 1, 2019

Related U.S. Application Data

(63) Continuation of application No. PCT/CN2017/105693, filed on Oct. 11, 2017.

(30) Foreign Application Priority Data

Oct. 13, 2016 (CN) ........................ 201610896179.2

(51) Int. Cl.
*H04N 21/2187* (2011.01)
*H04L 29/06* (2006.01)
(Continued)

(52) U.S. Cl.
CPC ......... *H04N 21/2187* (2013.01); *H04L 29/06* (2013.01); *H04L 65/4076* (2013.01);
(Continued)

(58) Field of Classification Search
CPC ........... H04N 21/2187; H04N 21/2381; H04N 21/633; H04N 21/6437; H04N 21/6373;
(Continued)

(56) References Cited

U.S. PATENT DOCUMENTS 6,233,618 B1 * 5/2001 Shannon ............ H04L 63/0236 709/229
6,259,701 B1 * 7/2001 Shur .................... H04L 12/185 370/252

(Continued)

FOREIGN PATENT DOCUMENTS

CN 1961590 A 5/2007
CN 102449954 A 5/2012

(Continued)

*Primary Examiner* — Tejis Daya
(74) *Attorney, Agent, or Firm* — Kilpatrick Townsend & Stockton LLP

(57) ABSTRACT

The present invention provides a live video transmission method and system and an apparatus. According to the method, an M2U device receives a UDP request sent by a client, where the UDP request includes a live channel identifier and is used to request video data of a live channel corresponding to the live channel identifier, and the live channel identifier includes a multicast address or a URL. Then, the M2U device obtains the video data corresponding to the live channel identifier, and obtains a source IP address and a source port of the UDP request, where the source IP address and the source port of the UDP request are used as a destination IP address and a destination port of a UDP unicast packet to be subsequently sent to the client.

22 Claims, 8 Drawing Sheets

(51) Int. Cl.

| | |
|---|---|
| ***H04N 21/84*** | (2011.01) |
| ***H04N 21/643*** | (2011.01) |
| ***H04N 21/858*** | (2011.01) |
| ***H04N 21/6405*** | (2011.01) |
| ***H04N 21/266*** | (2011.01) |
| ***H04N 21/6408*** | (2011.01) |
| ***H04N 21/6373*** | (2011.01) |
| ***H04N 21/6437*** | (2011.01) |
| ***H04N 21/633*** | (2011.01) |
| ***H04N 21/2381*** | (2011.01) |

(52) U.S. Cl.

CPC ............ *H04L 65/605* (2013.01); *H04L 69/16* (2013.01); *H04N 21/2381* (2013.01); *H04N 21/26616* (2013.01); *H04N 21/633* (2013.01); *H04N 21/6373* (2013.01); *H04N 21/643* (2013.01); *H04N 21/6405* (2013.01); *H04N 21/6408* (2013.01); *H04N 21/6437* (2013.01); *H04N 21/84* (2013.01); *H04N 21/8586* (2013.01)

(58) Field of Classification Search

CPC ......... H04N 21/6408; H04N 21/26616; H04N 21/6405; H04N 21/8586; H04N 21/643; H04N 21/84; H04L 65/605; H04L 29/06; H04L 65/4076; H04L 69/16; H04L 65/80; H04L 65/4084; H04L 65/4069

See application file for complete search history.

(56) References Cited

U.S. PATENT DOCUMENTS

| | | | | | |
|---|---|---|---|---|---|
| 7,549,160 | B1 * | 6/2009 | Podar | G06F 21/10 380/229 |
| 9,661,475 | B2 * | 5/2017 | Kish | H04N 21/6405 |
| 2003/0018914 | A1 * | 1/2003 | Cheng | H04L 63/0254 726/13 |
| 2006/0039388 | A1 | 2/2006 | Shur et al. | |
| 2007/0019645 | A1 * | 1/2007 | Menon | H04L 12/1818 370/390 |
| 2007/0280232 | A1 * | 12/2007 | Dec | H04L 41/5009 370/390 |
| 2008/0137681 | A1 | 6/2008 | Kish et al. | |
| 2008/0155612 | A1 | 6/2008 | Ikeda et al. | |
| 2008/0198771 | A1 * | 8/2008 | Iyengar | H04L 45/04 370/270 |
| 2009/0147718 | A1 | 6/2009 | Liu et al. | |
| 2009/0193481 | A1 | 7/2009 | Huang | |
| 2010/0303071 | A1 | 12/2010 | Kotalwar et al. | |
| 2011/0107379 | A1 * | 5/2011 | Lajoie | H04L 65/1016 725/87 |
| 2012/0155358 | A1 * | 6/2012 | Hao | H04L 65/4076 370/312 |
| 2013/0132995 | A1 | 5/2013 | Tu et al. | |
| 2014/0282777 | A1 | 9/2014 | Gonder et al. | |
| 2014/0282784 | A1 | 9/2014 | Pfeffer | |
| 2015/0106477 | A1 * | 4/2015 | Mai | H04L 12/1836 709/217 |
| 2015/0172731 | A1 * | 6/2015 | Hasek | H04N 21/454 725/28 |
| 2015/0312727 | A1 * | 10/2015 | Kish | H04W 88/08 370/312 |
| 2016/0044078 | A1 | 2/2016 | Hosur | |
| 2016/0198236 | A1 | 7/2016 | Li et al. | |
| 2016/0219311 | A1 | 7/2016 | Yamagishi | |
| 2016/0269801 | A1 | 9/2016 | Harden et al. | |
| 2016/0352531 | A1 | 12/2016 | Shen, IV et al. | |
| 2017/0054777 | A1 * | 2/2017 | Leung | H04M 7/0072 |
| 2017/0325073 | A1 * | 11/2017 | Kish | H04N 21/6405 |

FOREIGN PATENT DOCUMENTS

| | | | | |
|---|---|---|---|---|
| CN | 104426681 A | | 3/2015 | |
| CN | 104954313 A | | 9/2015 | |
| CN | 105657534 A | | 6/2016 | |
| CN | 106487690 A | | 3/2017 | |
| JP | H034348 A | | 1/1991 | |
| JP | H11205312 A | | 7/1999 | |
| JP | 2002185528 A | | 6/2002 | |
| WO | WO-2005114431 A2 | * | 12/2005 | H04L 29/12358 |
| WO | 2015150736 A1 | | 10/2015 | |

* cited by examiner

CONT. FROM FIG. 5b-1

CONT. FROM FIG. 5b-1

0 1 2 3
0 1 2 3 4 5 6 7 8 9 0 1 2 3 4 5 6 7 8 9 0 1 2 3 4 5 6 7 8 9 0 1

|TP| |F| RSV Length URL length

URL...

HAS data

... RTP redundant data

0: an index file; 1: initialization information; 2: a fragment

=1 indicates that decoding and playing can be performed only when the entire fragment is collected Valid data length URL length of the fragment or the index file URL content of the fragment or the index file Data of the fragment or the index file Redundant data used for FEC

FIG. 5b-2

LIVE VIDEO TRANSMISSION METHOD AND SYSTEM, AND APPARATUS

CROSS-REFERENCE TO RELATED APPLICATIONS

This application is a continuation of International Application No. PCT/CN2017/105693, filed on Oct. 11, 2017, which claims priority to Chinese Patent Application No. 201610896179.2, filed on Oct. 13, 2016. The disclosures of the aforementioned applications are hereby incorporated by reference in their entireties.

TECHNICAL FIELD

Embodiments of the present invention relate to Internet technologies, and in particular, to a live video transmission method and system and an apparatus.

BACKGROUND

As video on-live is increasingly favored by users, many over-the-top (English: over-the-top, OTT for short) video websites provide a live video service. However, a live video features in that users on a same channel watch same content, to be specific, for the users who watch the live channel, a large quantity of repeated data packets are transmitted in a network, a large quantity of network bandwidths are occupied, and a large quantity of network settlement fees are cost for an operator.

To overcome the foregoing problem, a multicast bearer OTT technology is provided in which a multicast bearer network is used to reduce network traffic and relieve load of a video source server. A unicast to multicast (English: unicast to multicast, U2M for short) device obtains video data from a video source server in a unicast manner, and delivers, in a multicast manner, the video data to a plurality of multicast to unicast (English: multicast to unicast, M2U for short) devices. A central processing unit (English: central processing unit, CPU for short) of the M2U device receives a multicast group notified by a live-broadcast management platform and corresponding channel information, joins the multicast group, receives a multicast packet, generates index files and media fragments based on the received channel information and the received multicast packet, and sends, based on a received Hypertext Transfer Protocol (English: Hypertext Transfer Protocol, HTTP for short) request for accessing a live channel by an application (English: application, APP for short) of a terminal device, an index file and a media fragment for the live channel to the APP in a unicast manner. To be specific, the M2U device converts the video data into an HTTP packet and sends the HTTP packet to the user-side terminal device in a unicast manner.

A capability of the CPU is required to implement the process in which the M2U device converts the video data into the HTTP packet. However, due to a limited capability of processing HTTP traffic by the CPU, when there is a relatively large quantity of users, a live video service cannot be implemented.

SUMMARY

Embodiments of the present invention provide a live video transmission method and system and an apparatus, to resolve the following problem: A capability of a CPU is required to implement a process in which an M2U device converts video data into an HTTP packet again; however, due to a limited capability of processing HTTP traffic by the CPU, when there is a relatively large quantity of users, a live video service cannot be implemented.

According to a first aspect of the present invention, a live video transmission method is provided. The method is applied to an M2U device, and includes:

receiving a User Datagram Protocol (English: User Datagram Protocol, UDP for short) request sent by a client, where the UDP request includes a live channel identifier and is used to request video data of a live channel corresponding to the live channel identifier;

obtaining the video data of the live channel corresponding to the live channel identifier;

obtaining a source IP address and a source port included in the UDP request, where the source IP address is an IP address of the client, and the source port is a port through which the client sends the UDP request; and sending the video data in a UDP unicast manner to the client based on the source IP address and the source port.

In this solution, the live channel identifier is usually a multicast address or a uniform resource locator (English: Uniform Resource Locator, URL for short). The M2U device obtains, based on the live channel identifier in the UDP request sent by the client, the video data that is of the UDP live channel corresponding to the live channel identifier and that is sent by a U2M device in a multicast manner, and directly sends, through hardware forwarding, the video data to the client in the UDP unicast manner without performing protocol conversion by using a CPU. Therefore, a throughput of the M2U device is effectively improved.

Based on the foregoing solution, the sending the video data in a UDP unicast manner to the client based on the source IP address and the source port includes:

obtaining a multicast packet in the video data;

changing a destination IP address of the multicast packet into the source IP address of the UDP request, and changing a destination port of the multicast packet into the source port of the UDP request, to obtain a UDP unicast packet; and sending the UDP unicast packet to the client.

In this solution, the M2U device obtains the multicast packet in the video data, changes, by using a hardware forwarding module, the destination IP address of the multicast packet into the source IP address of the client, changes the destination port into the source port through which the client sends the DUP request, and directly forwards the video data in a form of the UDP unicast packet to the client to be parsed and played without performing data protocol conversion by using a CPU. Therefore, when there is a relatively large quantity of users, video on-live may be implemented, and a throughput of the M2U device is improved.

Based on any one of the foregoing solutions, if the live channel identifier includes a multicast address, a specific implementation of obtaining, by the M2U device, the video data of the live channel corresponding to the live channel identifier includes:

sending a multicast join message to a U2M device corresponding to the multicast address, where the multicast join message includes the multicast address; and receiving the video data that is of the live channel corresponding to the multicast address and that is returned by the U2M device.

Optionally, based on any one of the foregoing solutions, if the live channel identifier includes a multicast address, before the receiving a User Datagram Protocol UDP request sent by a client, the method further includes: sending a multicast join message to a unicast to multicast U2M device, where the multicast join message is used to request video data of a plurality of live channels corresponding to a plurality of multicast addresses; and receiving the video data of the plurality of live channels that is sent by the U2M device; and another specific implementation of obtaining, by the M2U device, the video data of the live channel corresponding to the live channel identifier includes: obtaining, based on the multicast address, the video data of the live channel corresponding to the multicast address from the video data of the plurality of live channels.

The foregoing solutions provide two manners in which the M2U device obtains the video data of the live channel corresponding to the multicast address. In one manner, the M2U device directly sends the multicast join message including the multicast address, so that the U2M device returns the video data of the corresponding live channel to the M2U device based on the multicast address. In another manner, the M2U device sends the multicast join message including the plurality of multicast addresses, and obtains the data of the live channels corresponding to the plurality of multicast addresses, and the M2U device obtains, based on the multicast address in the request sent by the client, the video data corresponding to the multicast address from the local video data.

Optionally, if the live channel identifier includes a URL, the obtaining the video data of the live channel corresponding to the live channel identifier includes:

obtaining a multicast address corresponding to the URL based on the URL;

sending a multicast join message to a U2M device corresponding to the multicast address, where the multicast join message includes the multicast address; and receiving the video data that is of the live channel corresponding to the multicast address and that is returned by the U2M device.

Optionally, if the live channel identifier includes a URL, before the receiving a User Datagram Protocol UDP request sent by a client, the method further includes:

sending a multicast join message to a U2M device, where the multicast join message is used to request video data of a plurality of live channels corresponding to a plurality of multicast addresses; and receiving the video data of the plurality of live channels that is sent by the U2M device; and the obtaining the video data of the live channel corresponding to the live channel identifier includes:

obtaining a multicast address corresponding to the URL based on the URL; and obtaining, based on the multicast address, the video data of the live channel corresponding to the multicast address from the video data of the plurality of live channels.

Optionally, the obtaining a multicast address corresponding to the URL based on the URL includes:

querying a pre-obtained correspondence between a multicast address and a URL, and finding the multicast address corresponding to the URL; or sending a multicast address query message including the URL to a live-broadcast management platform, and receiving the multicast address that is corresponding to the URL and that is returned by the live-broadcast management platform.

Based on any one of the foregoing solutions, if the UDP request further includes a user identifier, before the obtaining the video data of the live channel corresponding to the live channel identifier, the method further includes: determining whether a user corresponding to the user identifier has permission to watch the live channel corresponding to the live channel identifier; and if the user corresponding to the user identifier has permission to watch the live channel corresponding to the live channel identifier, performing the step of obtaining the video data of the live channel corresponding to the live channel identifier.

This solution means that before the video data of the live channel corresponding to the multicast address is obtained, whether the user that logs in to the client has permission to watch the live channel further needs to be determined. If the user has no permission to watch the live channel, the M2U device does not respond to the UDP request. If the user has permission to watch the live channel, the M2U device obtains the video data in any one of the foregoing manners.

Based on the foregoing solution, the determining whether a user corresponding to the user identifier has permission to watch the live channel corresponding to the live channel identifier includes:

sending the user identifier, verification information, and the live channel identifier that are carried in the UDP request to the live-broadcast management platform for verification, and receiving a verification result returned by the live-broadcast management platform, where the verification result is used to indicate whether the user corresponding to the user identifier has permission to watch the live channel corresponding to the live channel identifier; or sending authorization information and the live channel identifier that are carried in the UDP request to the live-broadcast management platform for verification, and receiving a verification result returned by the live-broadcast management platform, where the verification result is used to indicate whether the user corresponding to the user identifier has permission to watch the channel corresponding to the live channel identifier.

According to a second aspect of the present invention, a live video transmission method is provided. The method is applied to a client, and includes:

sending a UDP request to an M2U device, where the UDP request includes a live channel identifier and is used to request video data of a live channel corresponding to the live channel identifier;

receiving the video data that is of the live channel and that is sent by the M2U device, where the video data is obtained by the M2U device based on the live channel identifier, and the video data is carried in a UDP unicast packet; and parsing the UDP unicast packet to play a video on the live channel.

In this solution, after receiving the UDP unicast packet of the M2U device, the client parses the UDP unicast packet to obtain the video on the live channel, and plays the video.

Optionally, the UDP request further includes: authorization information; and/or a user identifier and verification information.

According to a third aspect of the present invention, an M2U device is provided, including:

a receiving module, configured to receive a UDP request sent by a client, where the UDP request includes a live channel identifier and is used to request video data of a live channel corresponding to the live channel identifier;

a processing module, configured to obtain the video data of the live channel corresponding to the live channel identifier, where the processing module is further configured to obtain a source IP address and a source port included in the UDP request, where the source IP address is an IP address of the client, and the source port is a port through which the client sends the UDP request; and a sending module, configured to send the video data in a UDP unicast manner to the client based on the source IP address and the source port.

Optionally, the sending module is specifically configured to:

obtain a multicast packet in the video data;

change a destination IP address of the multicast packet into the source IP address of the UDP request, and change a destination port of the multicast packet into the source port of the UDP request, to obtain a UDP unicast packet; and send the UDP unicast packet to the client.

Optionally, if the live channel identifier includes a multicast address, the sending module is further configured to send a multicast join message to a U2M device corresponding to the multicast address, where the multicast join message includes the multicast address; and the receiving module is further configured to receive the video data that is of the live channel corresponding to the multicast address and that is returned by the U2M device.

Optionally, if the live channel identifier includes a multicast address, before the receiving module receives the UDP request sent by the client, the sending module is further configured to send a multicast join message to a U2M device, where the multicast join message is used to request video data of a plurality of live channels corresponding to a plurality of multicast addresses;

the receiving module is further configured to receive the video data of the plurality of live channels that is sent by the U2M device; and the processing module is specifically configured to obtain, based on the multicast address, the video data of the live channel corresponding to the multicast address from the video data of the plurality of live channels.

Optionally, if the live channel identifier includes a URL, the processing module is further configured to obtain a multicast address corresponding to the URL based on the URL;

the sending module is further configured to send a multicast join message to a U2M device corresponding to the multicast address, where the multicast join message includes the multicast address; and the receiving module is further configured to receive the video data that is of the live channel corresponding to the multicast address and that is returned by the U2M device.

Optionally, if the live channel identifier includes a URL, before the receiving module receives the UDP request sent by the client, the sending module is further configured to send a multicast join message to the U2M device, where the multicast join message is used to request video data of a plurality of live channels corresponding to a plurality of multicast addresses;

the receiving module is further configured to receive the video data of the plurality of live channels that is sent by the U2M device; and the processing module is specifically configured to:

obtain a multicast address corresponding to the URL based on the URL; and obtain, based on the multicast address, the video data of the live channel corresponding to the multicast address from the video data of the plurality of live channels.

Optionally, the processing module is further configured to: query a pre-obtained correspondence between a multicast address and a URL, and find the multicast address corresponding to the URL; or the sending module is further configured to send a multicast address query message including the URL to a live-broadcast management platform, and the receiving module is further configured to receive the multicast address that is corresponding to the URL and that is returned by the live-broadcast management platform.

Optionally, if the UDP request further includes a user identifier, the processing module is further configured to: determine whether a user corresponding to the user identifier has permission to watch the live channel corresponding to the live channel identifier; and if the user corresponding to the user identifier has permission to watch the live channel corresponding to the live channel identifier, perform the step of obtaining the video data of the live channel corresponding to the live channel identifier.

Optionally, the sending module is further configured to send the user identifier, verification information, and the live channel identifier that are carried in the UDP request to the live-broadcast management platform for verification, and the receiving module is further configured to receive a verification result returned by the live-broadcast management platform, where the verification result is used to indicate whether the user corresponding to the user identifier has permission to watch the live channel corresponding to the live channel identifier; or the sending module is further configured to send authorization information and the live channel identifier that are carried in the UDP request to the live-broadcast management platform for verification, and the receiving module is further configured to receive a verification result returned by the live-broadcast management platform, where the verification result is used to indicate whether the user corresponding to the user identifier has permission to watch the channel corresponding to the live channel identifier.

According to a fourth aspect of the present invention, a client is provided, including:

a sending module, configured to send a UDP request to an M2U device, where the UDP request includes a live channel identifier and is used to request video data of a live channel corresponding to the live channel identifier;

a receiving module, configured to receive the video data that is of the live channel and that is sent by the M2U device, where the video data is obtained by the M2U device based on the live channel identifier, and the video data is carried in a UDP unicast packet; and a processing module, configured to parse the UDP unicast packet to play a video on the live channel.

Optionally, the UDP request sent by the sending module further includes: authorization information; and/or a user identifier and verification information.

According to a fifth aspect of the present invention, an M2U device is provided, including: a memory configured to store program code and configuration information, a processor, and a hardware forwarding module.

The processor is configured to:

receive a UDP request sent by a client, where the UDP request includes a live channel identifier and is used to request video data of a live channel corresponding to the live channel identifier; and obtain the video data of the live channel corresponding to the live channel identifier, and obtain a source IP address and a source port included in the UDP request, where the source IP address is an IP address of the client, and the source port is a port through which the client sends the UDP request.

The hardware forwarding module is configured to send the video data in a UDP unicast manner to the client based on the source IP address and the source port.

Optionally, the hardware forwarding module is specifically configured to:

obtain a multicast packet in the video data;

change a destination IP address of the multicast packet into the source IP address of the UDP request, and change a destination port of the multicast packet into the source port of the UDP request, to obtain a UDP unicast packet; and send the UDP unicast packet to the client.

Optionally, if the live channel identifier includes a multicast address, the processor is further configured to send a multicast join message to a U2M device corresponding to the multicast address, where the multicast join message includes the multicast address; and the hardware forwarding module is further configured to receive the video data that is of the live channel corresponding to the multicast address and that is returned by the U2M device.

Optionally, if the live channel identifier includes a multicast address, the processor is further configured to send a multicast join message to a U2M device, the multicast join message is used to request video data of a plurality of live channels corresponding to a plurality of multicast addresses;

the hardware forwarding module is further configured to receive the video data of the plurality of live channels that is sent by the U2M device; and the processor is further configured to obtain, based on the multicast address, the video data of the live channel corresponding to the multicast address from the video data of the plurality of live channels.

Optionally, if the live channel identifier includes a URL, the processor is further configured to:

obtain a multicast address corresponding to the URL based on the URL;

send a multicast join message to a U2M device corresponding to the multicast address, where the multicast join message includes the multicast address; and receive the video data that is of the live channel corresponding to the multicast address and that is returned by the U2M device.

Optionally, if the live channel identifier includes a URL, before the processor receives the User Datagram Protocol UDP request sent by the client, the processor is further configured to:

send a multicast join message to a unicast to multicast U2M device, where the multicast join message is used to request video data of a plurality of live channels corresponding to a plurality of multicast addresses; and receive the video data of the plurality of live channels that is sent by the U2M device; and the processor is specifically configured to:

obtain a multicast address corresponding to the URL based on the URL; and obtain, based on the multicast address, the video data of the live channel corresponding to the multicast address from the video data of the plurality of live channels.

Optionally, the processor is specifically configured to:

query a pre-obtained correspondence between a multicast address and a URL, and find the multicast address corresponding to the URL; or send a multicast address query message including the URL to a live-broadcast management platform, and receive the multicast address that is corresponding to the URL and that is returned by the live-broadcast management platform.

Optionally, if the UDP request further includes a user identifier, before the obtaining the video data of the live channel corresponding to the multicast address, the processor is further configured to: determine whether a user corresponding to the user identifier has permission to watch the live channel corresponding to the live channel identifier; and if the user corresponding to the user identifier has permission to watch the live channel corresponding to the live channel identifier, perform the step of obtaining the video data of the live channel corresponding to the live channel identifier.

Optionally, the processor is further configured to: send the user identifier, verification information, and the live channel identifier that are carried in the UDP request to the live-broadcast management platform for verification, and receive a verification result returned by the live-broadcast management platform, where the verification result is used to indicate whether the user corresponding to the user identifier has permission to watch the live channel corresponding to the live channel identifier; or the processor is further configured to: send authorization information and the live channel identifier that are carried in the UDP request to the live-broadcast management platform for verification, and receive a verification result returned by the live-broadcast management platform, where the verification result is used to indicate whether the user corresponding to the user identifier has permission to watch the channel corresponding to the live channel identifier.

According to a sixth aspect of the present invention, user equipment is provided, including: a memory configured to store program code and configuration information, a transceiver, and a processor.

The transceiver is configured to send a User Datagram Protocol UDP request to an M2U device, where the UDP request includes a live channel identifier and is used to request video data of a live channel corresponding to the live channel identifier.

The transceiver is further configured to receive the video data that is of the live channel and that is sent by the M2U device, where the video data is obtained by the M2U device based on the live channel identifier, and the video data is carried in a UDP unicast packet.

The processor is configured to parse the UDP unicast packet to play a video on the live channel.

Optionally, the UDP request sent by the transceiver further includes: authorization information; and/or a user identifier and verification information.

According to a seventh aspect of the present invention, a live video transmission system is provided, including: the M2U device provided in any solution of the third aspect and the client provided in any solution of the fourth aspect.

Further, the system further includes a U2M device, and the U2M device is configured to:

receive a multicast join message that includes a multicast address and that is sent by the M2U device, and return the video data of a live channel corresponding to the multicast address to the M2U device; or receive a multicast join message that is used to request video data that is of live channels corresponding to a plurality of multicast addresses and that is sent by the M2U device, and return the video data of the plurality of live channels to the M2U device.

According to the live video transmission method and system and the apparatus provided in the present invention, the M2U device receives the UDP request sent by the client, where the UDP request includes the live channel identifier and is used to request the video data of the live channel corresponding to the live channel identifier, and then obtains the video data of the live channel corresponding to the live channel identifier. The M2U device obtains, based on the UDP request, the source IP address of the client and the source port through which the client sends the UDP request, and sends the video data to the client in the UDP unicast manner based on the source IP address and the source port. The M2U device directly sends, through hardware forwarding by using the source IP address and the source port through which a packet can be received, the video data in the UDP unicast manner without performing protocol conversion on the video data by using a CPU. Directly sending the video data through hardware forwarding can effectively improve a throughput of the M2U device. When there is a relatively large quantity of users, a live video service may be implemented.

BRIEF DESCRIPTION OF DRAWINGS

To describe the technical solutions in the embodiments of the present invention or in the prior art more clearly, the following briefly describes the accompanying drawings required for describing the embodiments or the prior art.

FIG. 5*b*-1 and FIG. 5*b*-2 are a schematic diagram of a transport protocol;

DESCRIPTION OF EMBODIMENTS

To make the purpose, technical solutions, and advantages of the embodiments of the present invention clearer, the following clearly describes the technical solutions of the embodiments of the present invention with reference to the accompanying drawings in the embodiments of the present invention.

Figure 1:
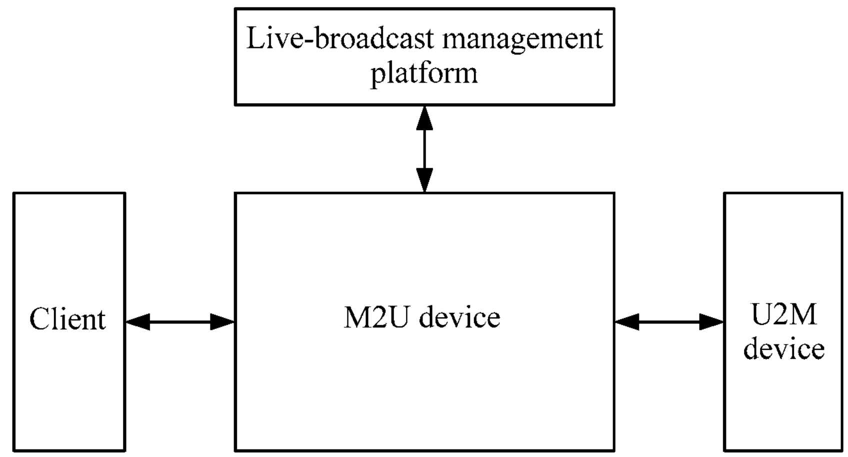
FIG. 1 is an architectural diagram of a live video transmission system according to the present invention.

FIG. 1 is an architectural diagram of a live video transmission system according to the present invention. As shown in FIG. 1, the system for video on-live mainly includes a user-side client such as an application (English: application, APP for short) for live broadcast, an M2U device, and a U2M device. In this system architecture, the U2M device obtains video data from an OTT server in a unicast manner, and delivers the video data to different M2U devices (each U2M device is connected to a plurality of M2U devices) in a multicast manner. Then, the M2U device sends the video data to the client according to a request of the client, and the client plays the video data for a user. In this process, a physical implementation form of the M2U device in a network may be an independent server, a router service board, a router forwarding board, or the like, and the client may run on a terminal device of the user, such as a mobile phone, a computer, a tablet computer, or the like. Optionally, the system further includes a live-broadcast management platform used to verify live-broadcast permission of the user.

Based on the network architecture, due to a very high forwarding capability of the router forwarding board, this solution provides an idea of using the forwarding capability of the forwarding board to implement an M2U function. The basic idea is as follows: After receiving a multicast packet, a hardware forwarding module changes a destination Internet Protocol (English: Internet Protocol, IP for short) address of the multicast packet into an IP address of the client, and changes a destination port of the multicast packet into a port of the client.

Figure 2:
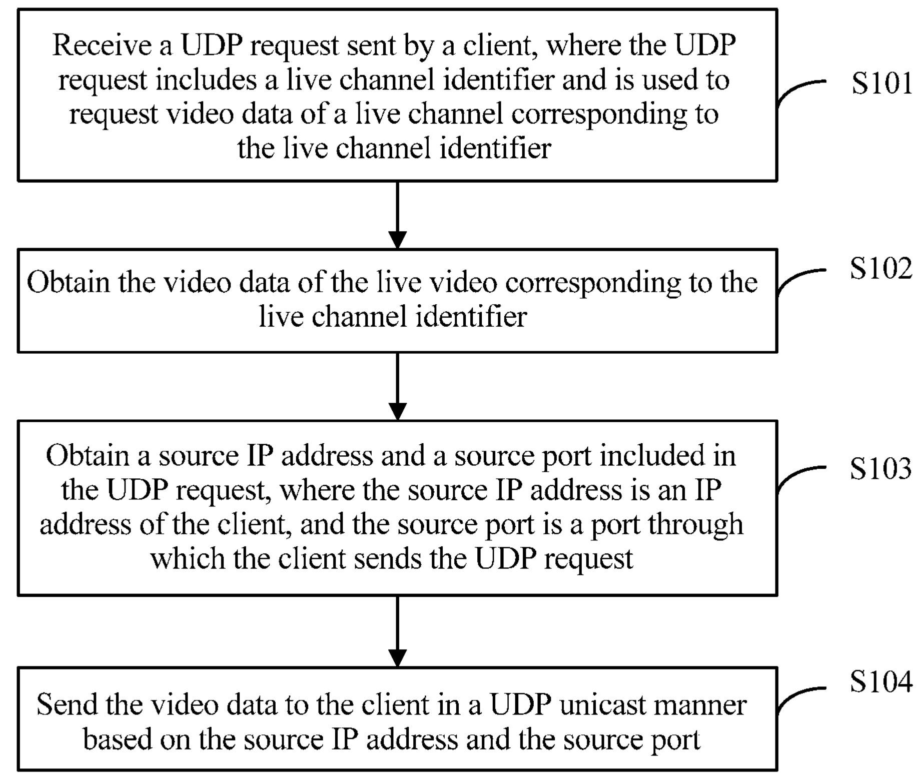
FIG. 2 is a flowchart of a first embodiment of a live video transmission method according to the present invention.

FIG. 2 is a flowchart of a first embodiment of a live video transmission method according to the present invention. In the system architecture shown in FIG. 1, as shown in FIG. 2, the live video transmission method is mainly applied to an M2U device, and specifically includes the following steps.

S101. Receive a UDP request sent by a client, where the UDP request includes a live channel identifier and is used to request video data of a live channel corresponding to the live channel identifier.

In this step, if the client determines, from a user's operation, that video data of a live channel needs to be obtained, the client sends a UDP request to the M2U device. The UDP request includes a live channel identifier, and the live channel identifier may be a multicast address or a URL of the live channel, so that the M2U device may obtain corresponding video data based on the multicast address or the URL.

In this solution, if the UDP request sent by the client carries the URL, the M2U device first needs to obtain, based on a correspondence between a URL and a multicast address, a multicast address corresponding to the URL. To be specific, the M2U device first queries the pre-obtained correspondence between a multicast address and a URL, and finds the multicast address corresponding to the URL. Alternatively, the M2U device sends the URL to a live-broadcast management platform, finds, by using the live-broadcast management platform, a multicast address corresponding to the URL, and then obtains the corresponding video data based on the multicast address.

Optionally, the UDP request further includes: authorization information; and/or a user identifier and verification information.

S102. Obtain the video data of the live channel corresponding to the live channel identifier.

In this step, a specific implementation of obtaining, by the M2U device, the video data of the live channel corresponding to the multicast address includes at least the following cases:

When the live channel identifier is the multicast address, the video data may be directly obtained in the following two manners:

In a first implementation, the M2U device sends a multicast join message to a U2M device corresponding to the multicast address, where the multicast join message includes the multicast address, and receives the video data that is of the live channel corresponding to the multicast address and that is returned by the U2M device.

The first implementation means that the M2U device directly sends the multicast join message including the multicast address to the U2M device, so that the U2M device returns, based on the multicast address, the video data of the corresponding live channel to the M2U device. To be specific, the U2M device needs to find, based on the multicast address, the video data corresponding to the multicast address from locally diverted video data, and returns the video data to the M2U device.

In a second implementation, before receiving the UDP request sent by the client, the M2U device sends a multicast join message to a U2M device, where the multicast join message is used to request video data of a plurality of live channels corresponding to a plurality of multicast addresses, and receives the video data of the plurality of live channels that is sent by the U2M device. After receiving the UDP request sent by the client, the M2U device obtains, based on the multicast address carried in the UDP request, the video data of the live channel corresponding to the multicast address from the video data of the plurality of live channels.

The second implementation means that the M2U device sends the multicast join message including the plurality of multicast addresses to the U2M device, and obtains the data of live channels that are respectively corresponding to the plurality of multicast addresses. The M2U device obtains, based on the multicast address in the request sent by the client, the video data corresponding to the multicast address from the local video data.

If the live channel identifier is the URL, before obtaining the video data in the foregoing two manners, the M2U device first needs to obtain a corresponding multicast address corresponding to the URL. The multicast address may be obtained based on the URL at least in the following specific manners: querying a pre-obtained correspondence between a multicast address and a URL, and finding the multicast address corresponding to the URL; or sending a multicast address query message including the URL to a live-broadcast management platform, and receiving the multicast address that is corresponding to the URL and that is returned by the live-broadcast management platform.

The step of obtaining the multicast address corresponding to the URL is usually performed before the multicast join message is sent to the unicast to multicast U2M device corresponding to the multicast address or before the video data of the live channel corresponding to the multicast address is obtained based on the multicast address from the video data of the plurality of live channels. This is not specifically limited in this solution provided that the multicast address corresponding to the URL is obtained before the multicast address is used.

S103. Obtain a source IP address and a source port included in the UDP request, where the source IP address is an IP address of the client, and the source port is a port through which the client sends the UDP request.

In this step, if the M2U device obtains the video data requested by the client, the M2U device needs to forward the video data to the client. In this solution, the M2U device obtains, based on the UDP request, the source IP address of the client and the port through which the UDP request is sent, and the source IP address and the port are used as a destination address and a destination port of the to-be-forwarded video data.

S104. Send the video data to the client in a UDP unicast manner based on the source IP address and the source port.

Based on the foregoing step, after obtaining, based on the UDP request, the source IP address of the client and the source port through which the UDP request is sent, the M2U device directly sends, by using a hardware forwarding module, the obtained video data to the client in the unicast manner without performing protocol conversion.

Specifically, because a UDP packet can be directly sent to a UDP receive end, the M2U device may return the video data to the client in the UDP unicast manner by using a hardware forwarding capability of a router forwarding board. A specific implementation process is as follows:

The M2U device obtains a multicast packet in the video data. The hardware forwarding module of the M2U device changes a destination IP address of the multicast packet into the source IP address of the UDP request, and changes a destination port of the multicast packet into the source port of the UDP request, to obtain a UDP unicast packet. Then the UDP unicast packet is sent to the client.

According to the live video transmission method provided in this embodiment, the client sends the UDP request to the M2U device, the M2U device obtains, based on the live channel identifier in the UDP request, the video data corresponding to the live channel corresponding to the live channel identifier, and obtains the multicast packet in the video data. After obtaining the multicast video data corresponding to the UDP request, the M2U device changes the multicast destination IP address and the multicast destination port into the obtained unicast destination IP address and the unicast destination port of the client, and directly forwards the video data to the client in a form of the UDP unicast packet to perform parsing and playing without performing data protocol conversion by using a CPU. Therefore, when there is a relatively large quantity of users, video on-live may be implemented, and a throughput of the M2U device is improved.

Figure 3:
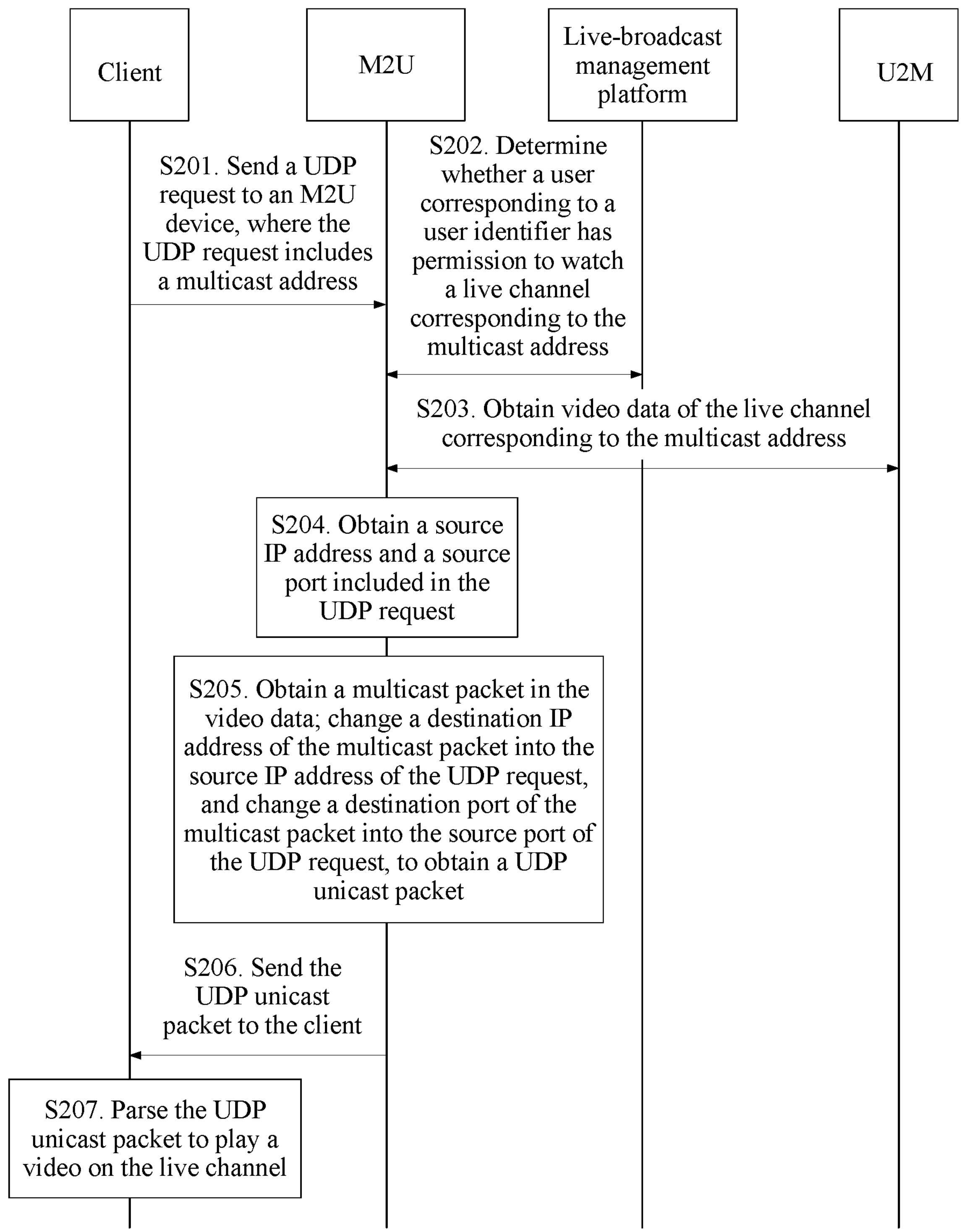
FIG. 3 is an interaction flowchart of a second embodiment of a live video transmission method according to the present invention.

FIG. 3 is an interaction flowchart of a second embodiment of a live video transmission method according to the present invention. As shown in FIG. 3, if a UDP request carries a multicast address, an interaction process of the live video transmission method is specifically as follows:

S201. Send a UDP request to an M2U device, where the UDP request includes a multicast address.

In this step, a user-side device sends, by using an operation performed by a user on a client, the UDP request to the M2U device to request video data of a live channel.

S202. Determine whether a user corresponding to a user identifier has permission to watch a live channel corresponding to the multicast address.

In a specific implementation, the UDP request further includes the user identifier (or the user identifier and a login password). The M2U device needs to verify permission of the user, and determines whether the user has permission to watch the live channel corresponding to the multicast address. There are at least two specific verification manners:

In a first manner, the M2U device sends the user identifier, verification information (to be specific, a registered user name, the login password, and the like), and the live channel identifier that are carried in the UDP request to a live-broadcast management platform for verification, and receives a verification result returned by the live-broadcast management platform. The verification result is used to indicate whether the user corresponding to the user identifier has permission to watch the live channel corresponding to the live channel identifier.

In a second manner, the M2U device sends authorization information and the live channel identifier that are carried in the UDP request to a live-broadcast management platform for verification, and receives a verification result returned by the live-broadcast management platform. The verification result is used to indicate whether the user corresponding to the user identifier has permission to watch the channel corresponding to the live channel identifier.

In the foregoing two manners, the live channel identifier may be a multicast address or a URL. The URL can uniquely identify the client. The URL is notified by an OTT server to the client. The URL is carried in the UDP request and is sent to the M2U device. Optionally, the UDP request may further carry authorization information, and when verifying whether the user has watch permission in the foregoing two manners, the M2U device may send the authorization information to the live-broadcast management platform for verification.

S203. Obtain video data of the live channel corresponding to the multicast address.

In this step, when the M2U device obtains the verification result returned by the live-broadcast management platform, and determines that the user has permission to watch a video on the live channel corresponding to the multicast address, the M2U device obtains the video data of the live channel corresponding to the multicast address. A specific obtaining manner is the same as that in the first embodiment. Details are not described herein again.

S204. Obtain a source IP address and a source port included in the UDP request.

S205. Obtain a multicast packet in the video data; change a destination IP address of the multicast packet into the source IP address of the UDP request, and change a destination port of the multicast packet into the source port of the UDP request, to obtain a UDP unicast packet.

In step S204 and step S205, the M2U device obtains, based on the UDP request, an IP address of the client, namely, the source IP address, and the port through which the client sends the UDP request, namely, the source port.

In this solution, as data interaction is implemented by a hardware forwarding module, the hardware forwarding module may change the destination address and the destination port in the multicast packet into the source IP address and the source port, to obtain the unicast packet.

S206. Send the UDP unicast packet to the client.

S207. Parse the UDP unicast packet to play a video on the live channel.

After changing the destination IP address and the destination port of the multicast packet, the hardware forwarding module of the M2U device directly sends the video data to the client in a form of the unicast packet. After receiving the packet, the client performs combination and parsing on the packet, and plays the obtained video on the live channel.

In the foregoing solution, optionally, if the UDP request sent by the client carries the URL, after receiving the UDP request, the M2U device obtains, based on a correspondence between a URL and a multicast address, a multicast address corresponding to the URL, or the M2U device sends a multicast address query message including the URL to the live-broadcast management platform, receives a multicast address that is corresponding to the URL and that is returned by the live-broadcast management platform. Then the M2U device obtains the video data based on the obtained multicast address in the foregoing manner and sends the video data to the client in the UDP unicast manner.

According to the live video transmission method provided in this embodiment, before obtaining, based on the UDP request sent by the client, the video data of the live channel corresponding to the multicast address, the M2U device further needs to determine whether the user who logs in to the client has permission to watch the live channel. If the user has no permission to watch the live channel, the M2U device does not respond to the UDP request. If the user has permission to watch the live channel, the M2U device obtains the video data that is of the UDP live channel and that is sent by a U2M device in a multicast manner, and directly sends, by using hardware forwarding, the video data to the client in the UDP unicast manner without performing protocol conversion by using a CPU. Therefore, a throughput of the M2U device is effectively improved.

Figure 4:
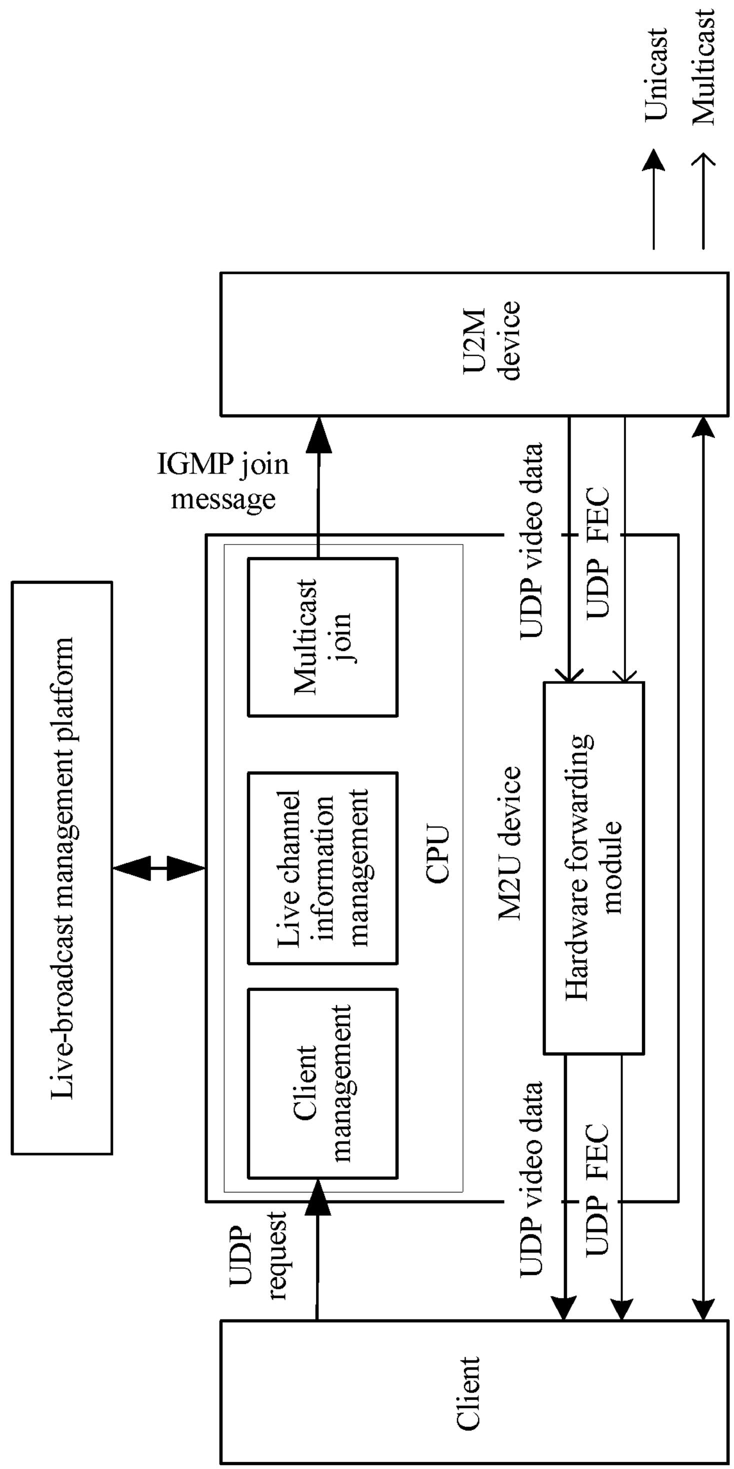
FIG. 4 is a schematic interaction diagram of a live video transmission system according to the present invention.

FIG. 4 is a schematic interaction diagram of a live video transmission system according to the present invention. As shown in FIG. 4, in the transmission system, a client (to be specific, an APP on a user equipment side) sends a video request to an M2U device, signaling interaction between the M2U device, a live-broadcast management platform, and a U2M device is completed by a processor (to be specific, a CPU) of the M2U device, and data interaction between the M2U device, the APP, and the U2M device is completed by a hardware forwarding module. In the solution, the CPU mainly includes a client management module, a live channel information module, and a multicast join module. With reference to the foregoing several embodiments, in this solution, that the U2M device is configured to return video data to the M2U device in a multicast manner specifically includes: receiving a multicast join message that includes a multicast address and that is sent by the M2U device, and returning the video data of a live channel corresponding to the multicast address to the M2U device; or receiving a multicast join message that is used to request video data that is of live channels corresponding to a plurality of multicast addresses and that is sent by the M2U device, and returning the video data of the plurality of live channels to the M2U device.

Figure 5A:
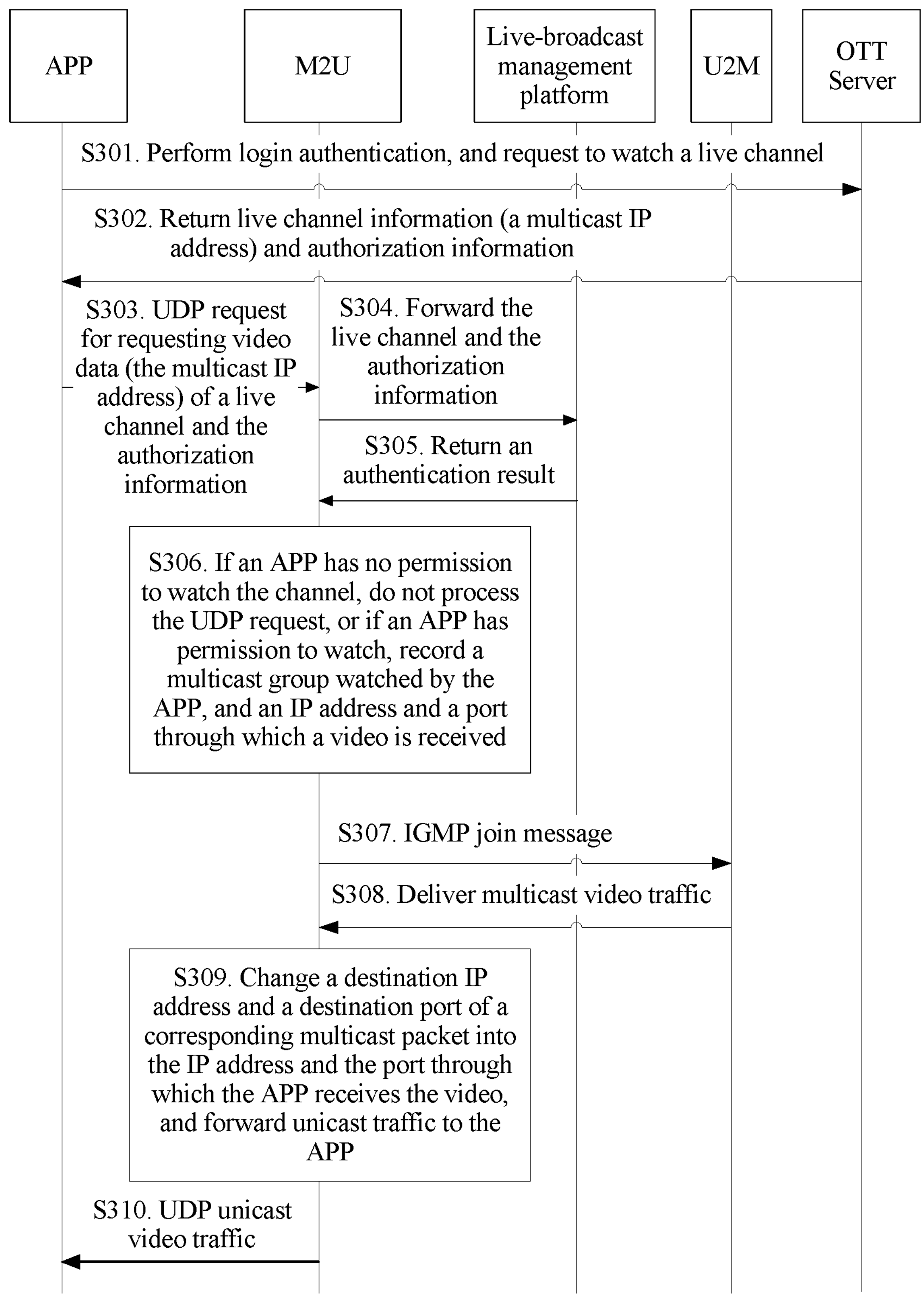
FIG. 5*a* is an interaction flowchart of an embodiment of a live video transmission method according to the present invention.

In any one of the foregoing technical solutions, the multicast address is usually a multicast IP address. FIG. 5*a* is an interaction flowchart of an embodiment of a live video transmission method according to the present invention. As shown in FIG. 5*a*, based on the schematic interaction diagram of the system shown in FIG. 4, a specific implementation process of the live video transmission method is as follows:

S301. A user passes APP login authentication, and requests to watch a live channel.

The user enables an APP on a terminal device by using an operation, and logs in to a video website. After performing login authentication by using a user name, the user taps a live channel, and requests to watch.

S302. An OTT server returns live channel information (a multicast IP address) and authorization information.

The OTT server returns a live channel identifier (for example, the multicast IP address or a URL) and the authorization information of the user. The authorization information is usually a string of characters, and indicates that the user has permission to watch the channel. For some free-to-air channels that can be watched by the user at will, there may be no authorization information.

S303. An APP sends a UDP request to request video data of the live channel (the multicast IP address) and the authorization information.

The APP sends the UDP request (a video request) to a multicast source by using a UDP unicast packet, and content of the request includes the live channel identifier (for example, the multicast IP address), the authorization information, and the like.

S304. An M2U device forwards the live channel and the authorization information to a live-broadcast management platform.

After the M2U device captures the UDP request packet, the M2U device forwards the live channel identifier (also referred to as the live channel information) and the authorization information of the user to the live-broadcast management platform, to determine whether the user has permission to watch the channel.

S305. The live-broadcast management platform returns an authentication result to the M2U device.

The live-broadcast management platform verifies whether the user has permission to watch the live channel. The verification method may be as follows: The live-broadcast management platform directly performs determining based on the authorization information, or forwards the user name and the password to the OTT server for verification. After verification is completed, the live-broadcast management platform returns the verification result to the M2U device.

S306. If the APP has no permission to watch the channel, the M2U device does not process the UDP request; if the APP has permission to watch, the M2U device records a multicast group watched by the APP, and an IP address and a port through which a video is received.

If the M2U device determines, based on the authentication result, that the APP (which represents the user) has no permission to watch the channel, the M2U device no longer processes a request for the channel. If the APP has permission to watch, the M2U device uses a source IP address and a source port of the UDP request packet as a destination IP address and a destination port through which the APP receives the video data.

S307. The M2U device sends an Internet Group Management Protocol (English: Internet Group Management Protocol, IGMP for short) join message.

The M2U device sends the IGMP join message to a U2M device to join a multicast address requested by the APP.

S308. A U2M device delivers multicast video traffic to the M2U device.

S309. The M2U device changes a destination IP address and a destination port of a corresponding multicast packet into the IP address and the port through which the APP receives the video, and forwards unicast traffic to the APP.

S310. The M2U device sends UDP unicast video traffic to the APP.

In the foregoing steps, the U2M device delivers multicast video data (to be specific, a video stream) to the M2U device. After receiving the multicast packet, the M2U device changes the destination IP address and the destination port into the IP address and the port through which the APP receives the video. The M2U device forwards the UDP unicast video traffic to the APP.

The APP performs combination and parsing on the received packet to obtain a live video and plays the live video.

In the foregoing solution, the OTT server may actively notify the APP of the multicast address corresponding to the channel. However, in specific implementation, the OTT server may send only one URL that can identify the live channel to the APP. Then, after obtaining the UDP request carrying the URL, the M2U device queries a multicast address corresponding to the URL from the live-broadcast management platform. The query process and the watch permission verification process may be simultaneously performed.

In addition, in step S302, the OTT server may not return the authorization information, the APP adds the user and the password of the APP to the UDP request, and then, the M2U device forwards the user and the password to the live-broadcast management platform for verification. This is not limited in this solution.

Figures 1, 5B:
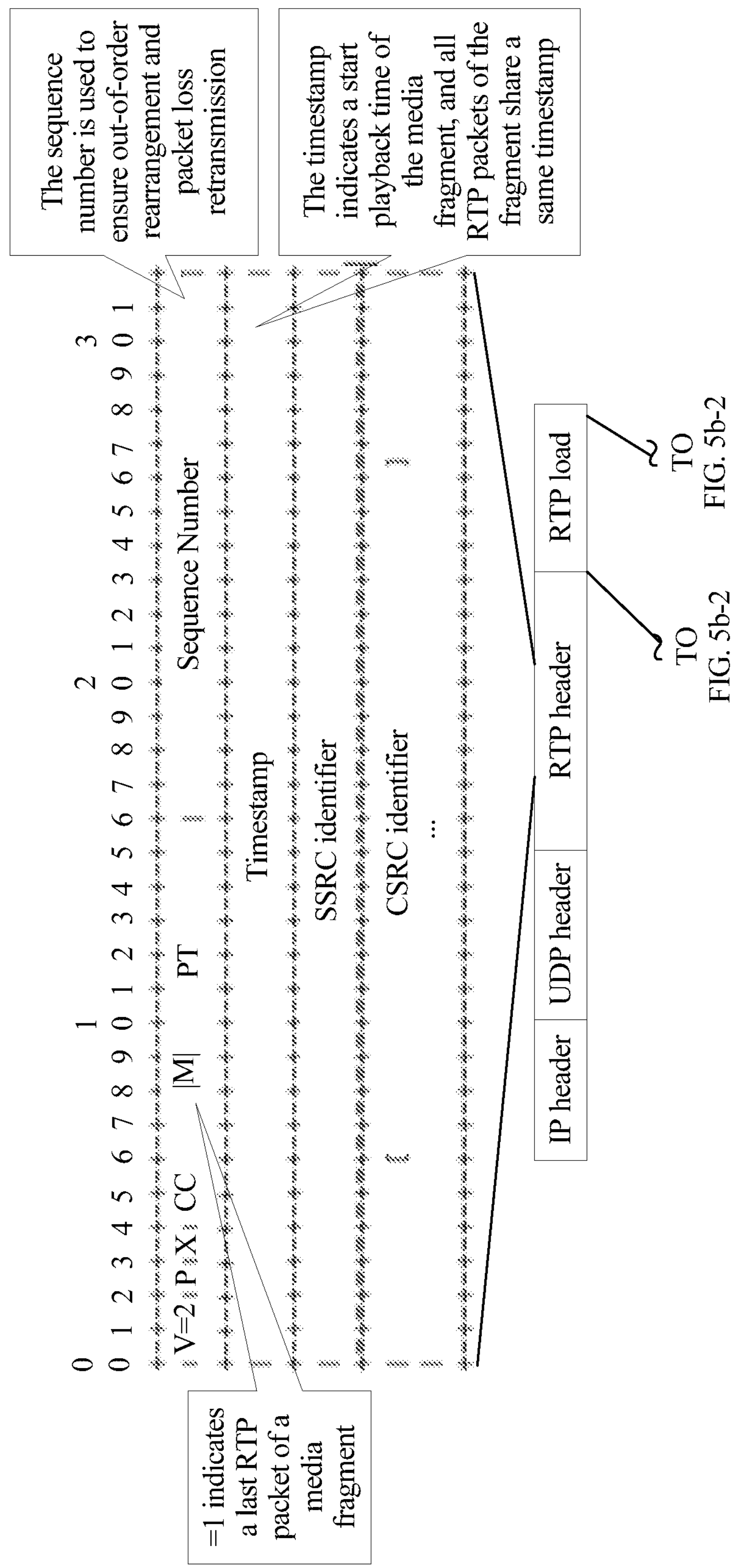

FIG. 5*b*-1 and FIG. 5*b*-2 are a schematic diagram of a transmission protocol. As shown in FIG. 5*b*-1 and FIG. 5*b*-2, in a process in which an M2U device obtains video data from a U2M device, the U2M device downloads an index file and a fragment in a unicast manner, and then divides the index file and the fragment into Real-Time Transport Protocol (English: Real-time Transport Protocol, RTP for short) over UDP multicast packets for transmission, and the packets are restored to the index file and the fragment on the M2U device. Therefore, a transport protocol that records information about the index file and the fragment needs to be determined, to perform restoration on the M2U device. The protocol is also applicable when the M2U device sends the video data to the client in a UDP unicast packet. The UDP packet includes an IP header, a UDP header, an RTP header, and RTP load. In the RTP header, M=1 indicates a last RTP packet of a media fragment, and a sequence number is used to ensure out-of-order rearrangement and packet loss retransmission of the fragment; a timestamp indicates a start playback time of the media fragment, and all RTP packets in the media fragment share a same timestamp. In addition, the RTP header further includes a synchronization source (English: synchronization source, SSRC for short) identifier and a contributing source (English: contributing source, CSRC for short) identifier. The RTP load includes data content, and a meaning of TP is as follows: 0 indicates the index file; 1 indicates initialization information; and 2 indicates the fragment. F=1 indicates that the entire fragment can be decoded and a video can be played only when the entire fragment is collected, a length indicates a valid data length, a URL length indicates a URL length of the fragment or the index file, a HAS data part is data of the media fragment or the index file, and RTP redundant data is used for forward error correction.

Based on the foregoing protocol, a terminal device side of the user receives the UDP unicast packet by using the APP, detects whether there is packet loss, and if there is packet loss, packet loss recovery is completed in a forward error correction (English: forward error correction, FEC for short) manner and a retransmission (English: retransmission, RET for short) manner. A specific execution process on a client side is as follows:

1. If the APP receives the UDP packet sent by the M2U device, determine whether there is packet loss based on the RTP sequence number. If RTP sequence numbers are inconsecutive, it may be considered that packet loss occurs, step 2 is to be performed for processing; otherwise, step 4 is to be performed for processing.

2. The APP recovers a lost packet based on FEC, and if all lost packets are successfully recovered, step 4 is to be performed for processing; otherwise, step 3 is to be performed for processing.

3. The APP requests a RET server to retransmit a lost RTP packet. After receiving the RTP packet retransmitted by the RET server, the APP re-sorts RTP packets based on the sequence number, and fills a hole caused by packet loss.

4. The APP checks a timestamp of the received RTP packet, and if the timestamp is different from a timestamp of a previous RTP packet, step 5 is to be performed for processing; otherwise, step 7 is to be performed for processing.

5. Different timestamps indicate that a new file object starts to be transmitted from this RTP packet. The APP parses a file type (an index file or a media fragment), and obtains a file name. The APP notifies a decoder of information about the new file object.

6. Obtain data of the file object by parsing load of the RTP packet, and deliver the data of the file object to the decoder for processing.

7. A same timestamp indicates that this RTP packet and the previous RTP packet carry a same file object. Obtain data of the file object by parsing load of the RTP packet, and deliver the data of the file object to the decoder for processing.

8. Check whether an M bit in the RTP header is 1. If the M bit is 1, it indicates that this packet is a last RTP packet of the file object, and notifies the information to the decoder.

Then, the decoder decodes the received data packet and obtains video data corresponding to the UDP request, and the video data is played.

Figure 6:
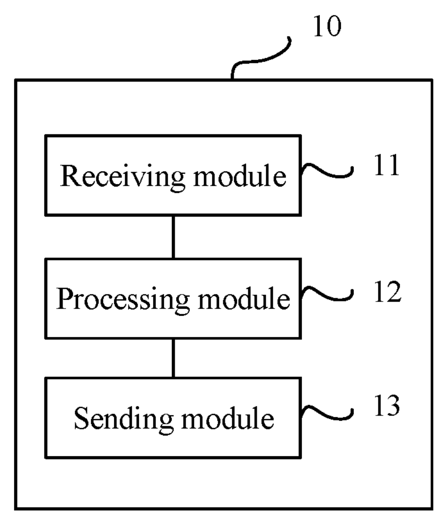
FIG. 6 is a schematic structural diagram of an embodiment of an M2U device according to the present invention.

FIG. 6 is a schematic structural diagram of an embodiment of an M2U device according to the present invention. As shown in FIG. 6, the M2U device 10 includes:

a receiving module 11, configured to receive a UDP request sent by a client, where the UDP request includes a live channel identifier and is used to request video data of a live channel corresponding to the live channel identifier;

a processing module 12, configured to obtain the video data of the live channel corresponding to the live channel identifier, where the processing module 12 is further configured to obtain a source IP address and a source port included in the UDP request, where the source IP address is an IP address of the client, and the source port is a port through which the client sends the UDP request; and a sending module 13, configured to send the video data in a UDP unicast manner to the client based on the source IP address and the source port.

The M2U device provided in this embodiment is configured to perform the technical solution of the M2U device in any one of the foregoing method embodiments, and an implementation principle and a technical effect of the M2U device are similar to those of the method embodiment. Details are not described herein again.

In a second embodiment of the M2U device, based on the foregoing embodiment, the sending module 13 is specifically configured to:

obtain a multicast packet in the video data;

change a destination IP address of the multicast packet into the source IP address of the UDP request, and change a destination port of the multicast packet into the source port of the UDP request, to obtain a UDP unicast packet; and send the UDP unicast packet to the client.

Optionally, if the live channel identifier includes a multicast address, the sending module 13 is further configured to send a multicast join message to a U2M device corresponding to the multicast address. The multicast join message includes the multicast address.

The receiving module 11 is further configured to receive the video data that is of the live channel corresponding to the multicast address and that is returned by the U2M device.

Optionally, if the live channel identifier includes a multicast address, before the receiving module 11 receives the User Datagram Protocol UDP request sent by the client, the sending module 13 is further configured to send a multicast join message to a U2M device, where the multicast join message is used to request video data of a plurality of live channels corresponding to a plurality of multicast addresses;

the receiving module 11 is further configured to receive the video data of the plurality of live channels that is sent by the U2M device; and the processing module 12 is specifically configured to obtain, based on the multicast address, the video data of the live channel corresponding to the multicast address from the video data of the plurality of live channels.

Optionally, if the live channel identifier includes a multicast address, the sending module 13 is further configured to send a multicast join message to a U2M device corresponding to the multicast address. The multicast join message includes the multicast address.

The receiving module 11 is further configured to receive the video data that is of the live channel corresponding to the multicast address and that is returned by the U2M device.

Optionally, if the live channel identifier includes a multicast address, before the receiving module 11 receives the UDP request sent by the client, the sending module 13 is further configured to send a multicast join message to a U2M device, where the multicast join message is used to request video data of a plurality of live channels corresponding to a plurality of multicast addresses;

the receiving module 11 is further configured to receive the video data of the plurality of live channels that is sent by the U2M device; and the processing module 12 is specifically configured to obtain, based on the multicast address, the video data of the live channel corresponding to the multicast address from the video data of the plurality of live channels.

Optionally, if the live channel identifier includes a URL, the processing module 12 is further configured to obtain a multicast address corresponding to the URL based on the URL.

The sending module 13 is further configured to send a multicast join message to a U2M device corresponding to the multicast address. The multicast join message includes the multicast address.

The receiving module 11 is further configured to receive the video data that is of the live channel corresponding to the multicast address and that is returned by the U2M device.

Optionally, if the live channel identifier includes a URL, before the receiving module 11 receives the UDP request sent by the client, the sending module 13 is further configured to send a multicast join message to the U2M device, where the multicast join message is used to request video data of a plurality of live channels corresponding to a plurality of multicast addresses;

the receiving module 11 is further configured to receive the video data of the plurality of live channels that is sent by the U2M device; and the processing module 12 is specifically configured to:

obtain a multicast address corresponding to the URL based on the URL; and obtain, based on the multicast address, the video data of the live channel corresponding to the multicast address from the video data of the plurality of live channels.

Optionally, the processing module 12 is further configured to: query a pre-obtained correspondence between a multicast address and a URL, and find the multicast address corresponding to the URL; or the sending module 13 is further configured to send a multicast address query message including the URL to a live-broadcast management platform, and the receiving module 11 is further configured to receive the multicast address that is corresponding to the URL and that is returned by the live-broadcast management platform.

Optionally, if the UDP request further includes a user identifier, the processing module 12 is further configured to: determine whether a user corresponding to the user identifier has permission to watch the live channel corresponding to the live channel identifier; and if the user corresponding to the user identifier has permission to watch the live channel corresponding to the live channel identification information, perform the step of obtaining the video data of the live channel corresponding to the live channel identifier.

Optionally, the sending module 13 is further configured to send the user identifier, verification information, and the live channel identifier that are carried in the UDP request to the live-broadcast management platform for verification, and the receiving module 11 is further configured to receive a verification result returned by the live-broadcast management platform, where the verification result is used to indicate whether the user corresponding to the user identifier has permission to watch the live channel corresponding to the live channel identifier; or the sending module 13 is further configured to send authorization information and the live channel identifier that are carried in the UDP request to the live-broadcast management platform for verification, and the receiving module 11 is further configured to receive a verification result returned by the live-broadcast management platform, where the verification result is used to indicate whether the user corresponding to the user identifier has permission to watch the channel corresponding to the live channel identifier.

The M2U device provided in this embodiment is configured to perform the technical solution of the M2U device in any one of the foregoing method embodiments, and an implementation principle and a technical effect of the M2U device are similar to those of the method embodiment. Details are not described herein again.

Figure 7:
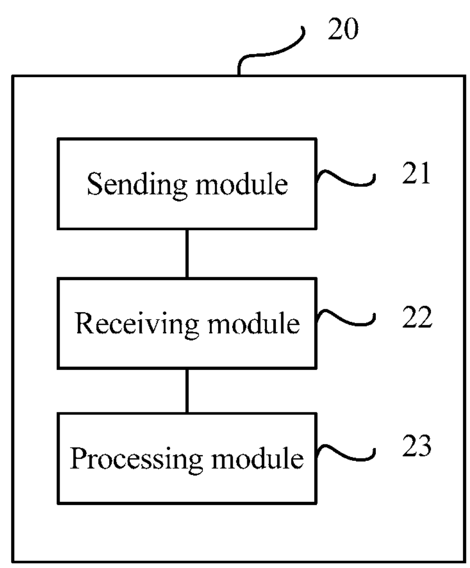
FIG. 7 is a schematic structural diagram of an embodiment of a client according to the present invention.

FIG. 7 is a schematic structural diagram of an embodiment of a client according to the present invention. As shown in FIG. 7, the client 20 includes:

a sending module 21, configured to send a UDP request to an M2U device, where the UDP request includes a live channel identifier and is used to request video data of a live channel corresponding to the live channel identifier;

a receiving module 22, configured to receive the video data that is of the live channel and that is sent by the M2U device, where the video data is obtained by the M2U device based on the live channel identifier, and the video data is carried in a UDP unicast packet; and a processing module 23, configured to parse the UDP unicast packet to play a video on the live channel.

Optionally, the UDP request sent by the sending module 21 further includes: authorization information; and/or a user identifier and verification information.

The client provided in this embodiment is configured to perform the technical solution of the client in any one of the foregoing method embodiments, and an implementation principle and a technical effect of the client are similar to those of the method embodiment. Details are not described herein again.

Figure 8:
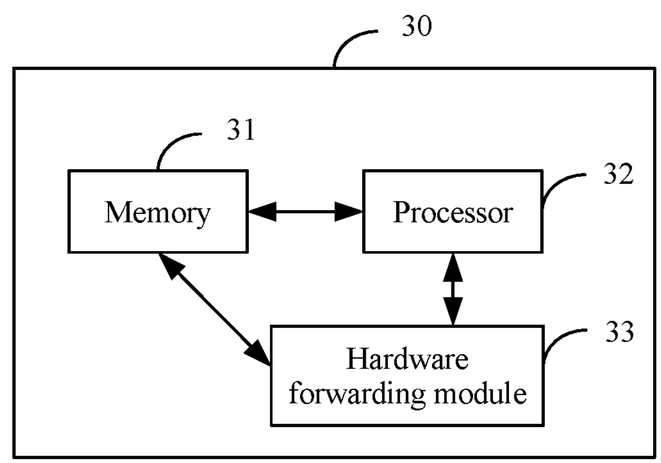
FIG. 8 is a schematic structural diagram of an entity embodiment of an M2U device according to the present invention.

FIG. 8 is a schematic structural diagram of an entity embodiment of an M2U device according to the present invention. As shown in FIG. 8, the M2U device 30 includes: a memory 31 configured to store program code and configuration information, a processor 32, and a hardware forwarding module 33.

The processor 32 is configured to:

receive a UDP request sent by a client, where the UDP request includes a live channel identifier and is used to request video data of a live channel corresponding to the live channel identifier; and obtain the video data of the live channel corresponding to the live channel identifier, and obtain a source IP address and a source port included in the UDP request, where the source IP address is an IP address of the client, and the source port is a port through which the client sends the UDP request.

The hardware forwarding module 33 is configured to send the video data in a UDP unicast manner to the client based on the source IP address and the source port.

Optionally, the hardware forwarding module 33 is specifically configured to:

obtain a multicast packet in the video data;

change a destination IP address of the multicast packet into the source IP address of the UDP request, and change a destination port of the multicast packet into the source port of the UDP request, to obtain a UDP unicast packet; and send the UDP unicast packet to the client.

Optionally, if the live channel identifier includes a multicast address, the processor 32 is further configured to send a multicast join message to a U2M device corresponding to the multicast address. The multicast join message includes the multicast address.

The hardware forwarding module 33 is further configured to receive the video data that is of the live channel corresponding to the multicast address and that is returned by the U2M device.

Optionally, if the live channel identifier includes a multicast address, the processor 32 is further configured to send a multicast join message to a unicast to multicast U2M device. The multicast join message is used to request video data of a plurality of live channels corresponding to a plurality of multicast addresses.

The hardware forwarding module 33 is further configured to receive the video data of the plurality of live channels that is sent by the U2M device.

The processor 32 is further configured to obtain, based on the multicast address, the video data of the live channel corresponding to the multicast address from the video data of the plurality of live channels.

Optionally, if the live channel identifier includes a URL, the processor 32 is further configured to:

obtain a multicast address corresponding to the URL based on the URL;

send a multicast join message to a U2M device corresponding to the multicast address, where the multicast join message includes the multicast address; and receive the video data that is of the live channel corresponding to the multicast address and that is returned by the U2M device.

Optionally, if the live channel identifier includes a URL, before the processor 32 receives the User Datagram Protocol UDP request sent by the client, the processor 32 is further configured to:

send a multicast join message to a U2M device, where the multicast join message is used to request video data of a plurality of live channels corresponding to a plurality of multicast addresses; and receive the video data of the plurality of live channels that is sent by the U2M device; and the processor 32 is specifically configured to:

obtain a multicast address corresponding to the URL based on the URL; and obtain, based on the multicast address, the video data of the live channel corresponding to the multicast address from the video data of the plurality of live channels.

Optionally, the processor 32 is specifically configured to:

query a pre-obtained correspondence between a multicast address and a URL, and find the multicast address corresponding to the URL; or send a multicast address query message including the URL to a live-broadcast management platform, and receive the multicast address that is corresponding to the URL and that is returned by the live-broadcast management platform.

Optionally, if the UDP request further includes a user identifier, before obtaining the video data of the live channel corresponding to the live channel identifier, the processor 32 is further configured to: determine whether a user corresponding to the user identifier has permission to watch the live channel corresponding to the live channel identifier; and if the user corresponding to the user identifier has permission to watch the live channel corresponding to the live channel identifier, perform the step of obtaining the video data of the live channel corresponding to the live channel identifier.

Optionally, the processor 32 is further configured to: send the user identifier, verification information, and the live channel identifier that are carried in the UDP request to the live-broadcast management platform for verification, and receive a verification result returned by the live-broadcast management platform, where the verification result is used to indicate whether the user corresponding to the user identifier has permission to watch the live channel corresponding to the live channel identifier; or the processor 32 is further configured to: send authorization information and the live channel identifier that are carried in the UDP request to the live-broadcast management platform for verification, and receive a verification result returned by the live-broadcast management platform, where the verification result is used to indicate whether the user corresponding to the user identifier has permission to watch the channel corresponding to the live channel identifier.

According to the M2U device provided in this embodiment, the processor is configured to complete signaling interaction between the entity of the M2U device and an entity of another device, and the hardware forwarding module is configured to complete a process of data interaction between the entity of the M2U device and an entity of another device. The M2U device is configured to perform the technical solution of the client in any method embodiment, and an implementation principle and a technical effect of the M2U device are similar to those of the method embodiment. Details are not described herein again.

Figure 9:
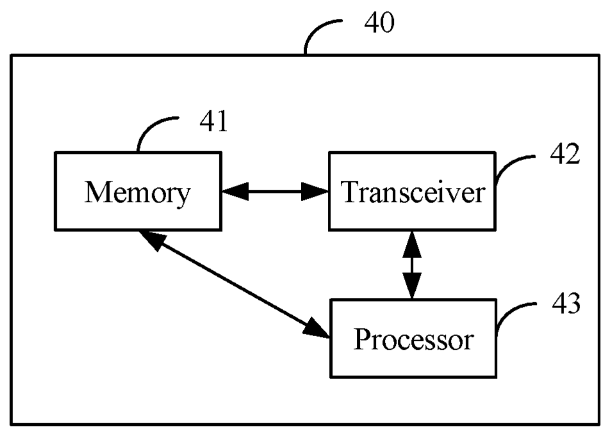
FIG. 9 is a schematic structural diagram of an entity embodiment of user equipment according to the present invention.

FIG. 9 is a schematic structural diagram of an entity embodiment of user equipment according to the present invention. As shown in FIG. 9, the user equipment 40 is configured to carry a client, and specifically includes: a memory 41 configured to store program code and configuration information, a transceiver 42, and a processor 43.

The transceiver 42 is configured to send a UDP request to an M2U device. The UDP request includes a live channel identifier and is used to request video data of a live channel corresponding to the multicast address.

The transceiver 42 is further configured to receive the video data that is of the live channel and that is sent by the M2U device. The video data is obtained by the M2U device based on the live channel identifier, and the video data is carried in a UDP unicast packet.

The processor 43 is configured to parse the UDP unicast packet to play a video on the live channel.

Optionally, the UDP request sent by the transceiver 42 further includes: authorization information; and/or a user identifier and verification information.

The user equipment provided in this embodiment is configured to perform the technical solution of the client in any one of the foregoing method embodiments, and an implementation principle and a technical effect of the user equipment are similar to those of the method embodiment. Details are not described herein again.

In the foregoing embodiments of the M2U device and the user equipment, it should be understood that the processor may be a central processing unit (English: central processing unit, CPU for short), or may be another general purpose processor, a digital signal processor (English: digital signal processor, DSP for short), an application-specific integrated circuit (English: application-specific integrated circuit, ASIC for short), or the like. The general purpose processor may be a microprocessor, or the processor may be any conventional processor or the like. The steps of the methods disclosed with reference to the embodiments of the present invention may be directly implemented by using a hardware processor, or may be implemented by using a combination of a hardware module and a software module in the processor.

Persons of ordinary skill in the art may understand that all or some of the steps of the method embodiments may be implemented by a program instructing related hardware. The program may be stored in a computer-readable memory. When the program is executed, the steps of the methods in the embodiments are performed. The memory (storage medium) includes: a read-only memory (English: read-only memory, ROM for short), a random access memory (English: random access memory, RAM for short), a flash memory, a hard disk, a solid-state drive, a magnetic tape (English: magnetic tape), a floppy disk (English: floppy disk), an optical disc (English: optical disc), and any combination thereof.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A live video transmission method, wherein the method is applied to a multicast to unicast (M2U) device, and comprises:

receiving a User Datagram Protocol (UDP) request sent by a client, wherein the UDP request comprises:

a live channel identifier, wherein the UDP request is used to request video data of a live channel corresponding to the live channel identifier; and obtaining the video data of the live channel in a multicast manner, wherein the video data corresponds to the live channel identifier;

obtaining a source IP address and a source port comprised in the UDP request, wherein the source IP address is an IP address of the client, and the source port is a port through which the client sends the UDP request; and sending the video data in a UDP unicast manner to the client based on the source IP address and the source port.

2. The method according to claim 1, wherein sending the video data in a UDP unicast manner to the client based on the source IP address and the source port comprises:

obtaining a multicast packet in the video data;

changing a destination IP address of the multicast packet into the source IP address of the UDP request, and changing a destination port of the multicast packet into the source port of the UDP request, to obtain a UDP unicast packet; and sending the UDP unicast packet to the client.

3. The method according to claim 2, wherein:

the live channel identifier comprises a multicast address; and obtaining the video data of the live channel corresponding to the live channel identifier comprises:

sending a multicast join message to a unicast to multicast (U2M) device corresponding to the multicast address, wherein the multicast join message comprises the multicast address; and receiving the video data that is of the live channel corresponding to the multicast address and that is returned by the U2M device.

4. The method according to claim 2, wherein:

the live channel identifier comprises a multicast address;

before receiving a User Datagram Protocol (UDP) request sent by a client, the method further comprises:

sending a multicast join message to a unicast to multicast (U2M) device, wherein the multicast join message is used to request video data of a plurality of live channels corresponding to a plurality of multicast addresses; and receiving the video data of the plurality of live channels that is sent by the U2M device; and obtaining the video data of the live channel corresponding to the live channel identifier comprises:

obtaining, based on the multicast address, the video data of the live channel corresponding to the multicast address from the video data of the plurality of live channels.

5. The method according to claim 2, wherein:

the live channel identifier comprises a uniform resource locator (URL); and obtaining the video data of the live channel corresponding to the live channel identifier comprises:

obtaining a multicast address corresponding to the URL based on the URL;

sending a multicast join message to a unicast to multicast (U2M) device corresponding to the multicast address, wherein the multicast join message comprises the multicast address; and receiving the video data that is of the live channel corresponding to the multicast address and that is returned by the U2M device.

6. The method according to claim 2, wherein:

the live channel identifier comprises a uniform resource locator URL; and before receiving a User Datagram Protocol (UDP) request sent by a client, the method further comprises:

sending a multicast join message to a unicast to multicast (U2M) device, wherein the multicast join message is used to request video data of a plurality of live channels corresponding to a plurality of multicast addresses; and receiving the video data of the plurality of live channels that is sent by the U2M device; and obtaining the video data of the live channel corresponding to the live channel identifier comprises:

obtaining a multicast address corresponding to the URL based on the URL; and obtaining, based on the multicast address, the video data of the live channel corresponding to the multicast address from the video data of the plurality of live channels.

7. The method according to the claim 5, wherein obtaining a multicast address corresponding to the URL based on the URL comprises:

querying a pre-obtained correspondence between a multicast address and a URL, and finding the multicast address corresponding to the URL; or sending a multicast address query message comprising the URL to a live-broadcast management platform, and receiving the multicast address that is corresponding to the URL and that is returned by the live-broadcast management platform.

8. The method according to claim 1, wherein:

the UDP request further comprises a user identifier; and before obtaining the video data of the live channel corresponding to the live channel identifier, the method further comprises:

determining whether a user corresponding to the user identifier has permission to watch the live channel corresponding to the live channel identifier; and if the user corresponding to the user identifier has permission to watch the live channel corresponding to the live channel identifier, performing the step of obtaining the video data of the live channel corresponding to the live channel identifier.

9. The method according to claim 8, wherein determining whether a user corresponding to the user identifier has permission to watch the live channel corresponding to the live channel identifier comprises:

sending the user identifier, verification information, and the live channel identifier that are carried in the UDP request to a live-broadcast management platform for verification, and receiving a verification result returned by the live-broadcast management platform, wherein the verification result is used to indicate whether the user corresponding to the user identifier has permission to watch the live channel corresponding to the live channel identifier; or sending authorization information and the live channel identifier that are carried in the UDP request to the live-broadcast management platform for verification, and receiving a verification result returned by the live-broadcast management platform, wherein the verification result is used to indicate whether the user corresponding to the user identifier has permission to watch the channel corresponding to the live channel identifier.

10. A multicast to unicast M2U device, comprising:

a receiving module, configured to receive a User Datagram Protocol (UDP) request sent by a client, wherein the UDP request comprises:

a live channel identifier, wherein the UDP request is used to request video data of a live channel corresponding to the live channel identifier; and a processing module, configured to obtain the video data of the live channel in a multicast manner, wherein the video data corresponds to the live channel identifier, wherein the processing module is further configured to obtain a source IP address and a source port comprised in the UDP request, wherein the source IP address is an IP address of the client, and the source port is a port through which the client sends the UDP request; and a sending module, configured to send the video data in a UDP unicast manner to the client based on the source IP address and the source port.

11. The M2U device according to claim 10, wherein the sending module is specifically configured to:

obtain a multicast packet in the video data;

change a destination IP address of the multicast packet into the source IP address of the UDP request, and change a destination port of the multicast packet into the source port of the UDP request, to obtain a UDP unicast packet; and send the UDP unicast packet to the client.

12. The M2U device according to claim 11, wherein:

the live channel identifier comprises a multicast address;

the sending module is further configured to send a multicast join message to a unicast to multicast (U2M) device corresponding to the multicast address, wherein the multicast join message comprises the multicast address; and the receiving module is further configured to receive the video data that is of the live channel corresponding to the multicast address and that is returned by the U2M device.

13. The M2U device according to claim 11, wherein:

the live channel identifier comprises a multicast address;

before the receiving module receives the User Datagram Protocol (UDP) request sent by the client, the sending module is further configured to send a multicast join message to a unicast to multicast (U2M) device, wherein the multicast join message is used to request video data of a plurality of live channels corresponding to a plurality of multicast addresses;

the receiving module is further configured to receive the video data of the plurality of live channels that is sent by the U2M device; and the processing module is specifically configured to obtain, based on the multicast address, the video data of the live channel corresponding to the multicast address from the video data of the plurality of live channels.

14. The M2U device according to claim 11, wherein:

the live channel identifier comprises a uniform resource locator (URL);

the processing module is further configured to obtain a multicast address corresponding to the URL based on the URL;

the sending module is further configured to send a multicast join message to a unicast to multicast (U2M) device corresponding to the multicast address, wherein the multicast join message comprises the multicast address; and the receiving module is further configured to receive the video data that is of the live channel corresponding to the multicast address and that is returned by the U2M device.

15. The M2U device according to claim 11, wherein:

the live channel identifier comprises a uniform resource locator (URL);

before the receiving module receives the User Datagram Protocol (UDP) request sent by the client, the sending module is further configured to send a multicast join message to a unicast to multicast (U2M) device, wherein the multicast join message is used to request video data corresponding to a plurality of live channels corresponding to a plurality of multicast addresses;

the receiving module is further configured to receive the video data of the plurality of live channels that is sent by the U2M device; and the processing module is specifically configured to:

obtain a multicast address corresponding to the URL based on the URL; and obtain, based on the multicast address, the video data of the live channel corresponding to the multicast address from the video data of the plurality of live channels.

16. The M2U device according to claim 14, wherein:

the processing module is further configured to query a pre-obtained correspondence between a multicast address and a URL, and find the multicast address corresponding to the URL; or the sending module is further configured to send a multicast address query message comprising the URL to a live-broadcast management platform; and the receiving module is further configured to receive the multicast address that is corresponding to the URL and that is returned by the live-broadcast management platform.

17. The M2U device according to claim 10, wherein:

the UDP request further comprises a user identifier; and the processing module is further configured to:

determine whether a user corresponding to the user identifier has permission to watch the live channel corresponding to the live channel identifier; and if the user corresponding to the user identifier has permission to watch the live channel corresponding to the live channel identifier, perform the step of obtaining the video data of the live channel corresponding to the live channel identifier.

18. The M2U device according to claim 17, wherein:

the sending module is further configured to send the user identifier, verification information, and the live channel identifier that are carried in the UDP request to a live-broadcast management platform for verification, and the receiving module is further configured to receive a verification result returned by the live-broadcast management platform, wherein the verification result is used to indicate whether the user corresponding to the user identifier has permission to watch the live channel corresponding to the live channel identifier; or the sending module is further configured to send authorization information and the live channel identifier that are carried in the UDP request to the live-broadcast management platform for verification, and the receiving module is further configured to receive a verification result returned by the live-broadcast management platform, wherein the verification result is used to indicate whether the user corresponding to the user identifier has permission to watch the channel corresponding to the live channel identifier.

19. A live video transmission system, comprising:

a multicast to unicast (M2U) device; and a client, wherein the M2U device is configured to:

receive a User Datagram Protocol (UDP) request sent by the client, wherein the UDP request comprises:

a live channel identifier, wherein the UDP request is used to request video data of a live channel corresponding to the live channel identifier; and obtain the video data of the live channel corresponding to the live channel identifier;

obtain a source IP address and a source port comprised in the UDP request, wherein the source IP address is an IP address of the client, and the source port is a port through which the client sends the UDP request; and send the video data in a UDP unicast manner to the client based on the source IP address and the source port; and wherein the client is configured to:

send the UDP request to the M2U device, receive the video data that is of the live channel in a multicast manner and that is sent by the M2U device, and parse the UDP unicast packet to play a video on the live channel.

20. The system according to claim 19, wherein the system further comprises:

a unicast to multicast (U2M) device, and the U2M device is configured to:

receive a multicast join message that comprises a multicast address and that is sent by the M2U device, and return the video data of a live channel corresponding to the multicast address to the M2U device; or receive a multicast join message that is used to request video data that is of live channels corresponding to a plurality of multicast addresses and that is sent by the M2U device, and return the video data of the plurality of live channels to the M2U device.

21. The method according to claim 1, wherein sending the video data in a UDP unicast manner to the client based on the source IP address and the source port comprises:

sending, through hardware forwarding, the video data to the client in the UDP unicast manner.

22. A multicast to unicast M2U device, comprising:

a processor; wherein the processor is configured to:

receive a User Datagram Protocol (UDP) request sent by a client, wherein the UDP request comprises:

a live channel identifier, wherein the UDP request is used to request video data of a live channel corresponding to the live channel identifier; and authorization information;

obtain the video data of the live channel in a multicast manner, wherein the video data corresponds to the live channel identifier; and obtain a source IP address and a source port included in the UDP request, wherein the source IP address is an IP address of the client and the source port is a port through which the client sends the UDP request; and a hardware forwarding module, wherein the hardware forwarding module is configured to:

send the video data in a UDP unicast manner to the client based on the source IP address and the source port.

* * * * *